United States Patent
Bloom et al.

(10) Patent No.: US 7,310,419 B1
(45) Date of Patent: *Dec. 18, 2007

(54) VIRTUAL WORK ENVIRONMENT FOR REMOTE USERS

(75) Inventors: Deborah M. Bloom, Clifton, NJ (US); Mark Jeffrey Foladare, Each Brunswick, NJ (US); Shelley B. Goldman, East Brunswick, NJ (US); Thaddeus Julius Kowalski, Summit, NJ (US)

(73) Assignee: AT&T Corp., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/411,726

(22) Filed: Apr. 26, 2006

Related U.S. Application Data (63) Continuation of application No. 10/299,364, filed on Nov. 18, 2002, now Pat. No. 7,062,032.

(51) Int. Cl.
*H04M 7/00* (2006.01)
(52) U.S. Cl. .................. 379/220.01; 379/219
(58) Field of Classification Search ..............
379/265.02–265.04, 265.09, 219, 220.01, 379/229, 230; 709/201; 370/352
See application file for complete search history.

(56) References Cited

U.S. PATENT DOCUMENTS

| | | | |
|---|---|---|---|
| 5,905,776 | A | 5/1999 | Shaffer |
| 5,907,547 | A | 5/1999 | Foladare et al. |
| 5,914,951 | A | 6/1999 | Bentley et al. |
| 5,999,612 | A | 12/1999 | Dunn et al. |
| 6,049,602 | A | 4/2000 | Foladare et al. |
| 6,366,577 | B1 | 4/2002 | Donovan |
| 6,404,874 | B1 | 6/2002 | Chestnut |
| 6,449,269 | B1 | 9/2002 | Edholm |
| 7,039,857 | B2 * | 5/2006 | Beck et al. ............... 715/500.1 |

* cited by examiner

*Primary Examiner*—William J. Deane, Jr.
(74) *Attorney, Agent, or Firm*—Henry Brendzel (57) ABSTRACT

An arrangement provides a work environment to a remote user who is logged-in as a member of an enterprise, which work environment includes both a telecommunication capability and a data processing capability, and both are concurrently associated with the logged-in user. The data processing capability is restricted to the user obtaining only views of files, rather than the files themselves, and all file processing that can potentially store data is restricted to applications that can store files only in a range of locations specified by the enterprise.

9 Claims, 4 Drawing Sheets

FIG. 4

VIRTUAL WORK ENVIRONMENT FOR REMOTE USERS

RELATED APPLICATION

This application is a Continuation of application Ser. No. 10/299,364, filed Nov. 18, 2002 now U.S. Pat. No. 7,062,032.

FIELD OF THE INVENTION

This invention relates communication, and more particularly to a method and a system for providing access for a remote user's telephone and computer arrangement to a telecommunication and computing environment of an enterprise, thereby providing a complete telecommunication and data processing work environment for the remote user.

BACKGROUND OF THE INVENTION

The vast majority of US enterprises is "wired" in the sense that almost all of the enterprise employees use computers, or at least have access to computers, and those computers are interconnected to form networks; the combination of these networks commonly called an intranet. Also, often, those computers and their networks include means for connecting to the Internet (public packet network).

In recent years the computer and communication networks have been linked through Computer Telephony Integration (CTI) applications, which facilitate incoming and outgoing call handling and control. CTI applications can be used to seamlessly interface the caller, the called party, and information on a host computer for a variety of applications. CTI applications deliver caller ID, automatic number identification (ANI), dialed number identification services (DNIS), and interactive voice response (IVR) dialed digits, such as a customer's account number, to a software application. CTI applications can also deliver request signals, such as "hold call" or "transfer call", to a telephone system. Even complete faxes that are delivered to a telephone number belonging to the enterprise can be made to the screen of a computer in the enterprise's computer network.

In addition to the use of data networks in connection with CTI applications, IP telephony, where telephone calls traverse only the Intenet, has also advanced. Numerous patents have issued for IP telephones, such as U.S. Pat. No. 6,449,269, and there are even commercially available IP telephones, such as the Polycom SountPoint IP 400 telephone made by Toshiba.

In a slightly different but related art, client/server computing has become prevalent over the past years. Distributed computing allows one machine to delegate some of its work to another machine that might be better suited to perform that work. For example, the server could be a high-powered computer, while the client is simply a desktop personal computer (PC). In some arrangements the files that are processed are stored in the server as well, and in still other arrangements, the executables (programs) in the host employ a virtual machine that employs the same instruction set as that of the client, so that files can be executed in both the network host and at the client machine. See, U.S. Pat. No. 6,003,065. An arrangement where files of a PC are stored in a network host so that they can be executed from a different remote location is described in U.S. Pat. No. 6,263,363. An arrangement where files can be executed only in the network, and the client machine is reduced to a terminal is illustrated in U.S. Pat. No. 6,409,602.

Employees have become accustomed to the significant information handling capabilities of the combined communication and computing networks of enterprises, and various means have been developed to provide the same, or close to the same, capability for telecommuting employees through use of the Internet. For example, U.S. Pat. No. 6,404,874 describes a system for telecommuting employees. It includes a PBX, an enterprise computer network, and a Telecommute Server therebetween. When a call is received at the PBX that is destined to the office extension of an employee, the Telecommute Server checks whether the employee is logged into the computer network via the employee's office computer. If so, the assumption is made that the employee is at work, and the call is forwarded to the employee's office extension. When the telecommute server determines that the employee is logged in from the employee's home computer, the call is forwarded to the employee's home telephone. If the employee is found to not be logged into the computer network, the call forwarding is carried out in accordance with preselected, stored, instructions.

This patent does not deal with calls made by the telecommuting employee, or with computing access restrictions of the telecommuting employee when the employee is connected to the network from the employee's home computer. A more stringent situation presents itself in connection with consultants who are physically located remotely from the enterprise's communication and computing environments, and for whom it is desirable to provide access, but on a highly constrained basis; particularly to the enterprise's computing intranet.

SUMMARY

An advance in the art is achieved with an arrangement wherein a remote user logs in to obtain a work environment of a sponsor enterprise. In this work environment, the user's telecommunications instrument appears to both the user and to others as if the logged in user is a member of the sponsor enterprise. Additionally, in connection with the user's communication capabilities in this work environment, the user receives access only to files that are made available by the sponsor enterprise, under conditions that are specified by the sponsor. One such condition is that only applications provided by the sponsor enterprise have access to these files, and the range of locations into which these applications can store files is limited to locations specifies by the sponsor organization, which excludes any storage devices at the remote user's location. This is achieved through an arrangement that provides a work environment to a logged-in user that includes both network telecommunication capabilities and network computing capabilities. Illustratively, a desktop browser window that includes an icon for telephony service, and icons for various file manipulation applications represents this work environment. In one embodiment, local storing of files is precluded by the nature of the interface, which provides only screen views of files, rather than access to the files themselves.

DETAILED DESCRIPTION

Figure 1:
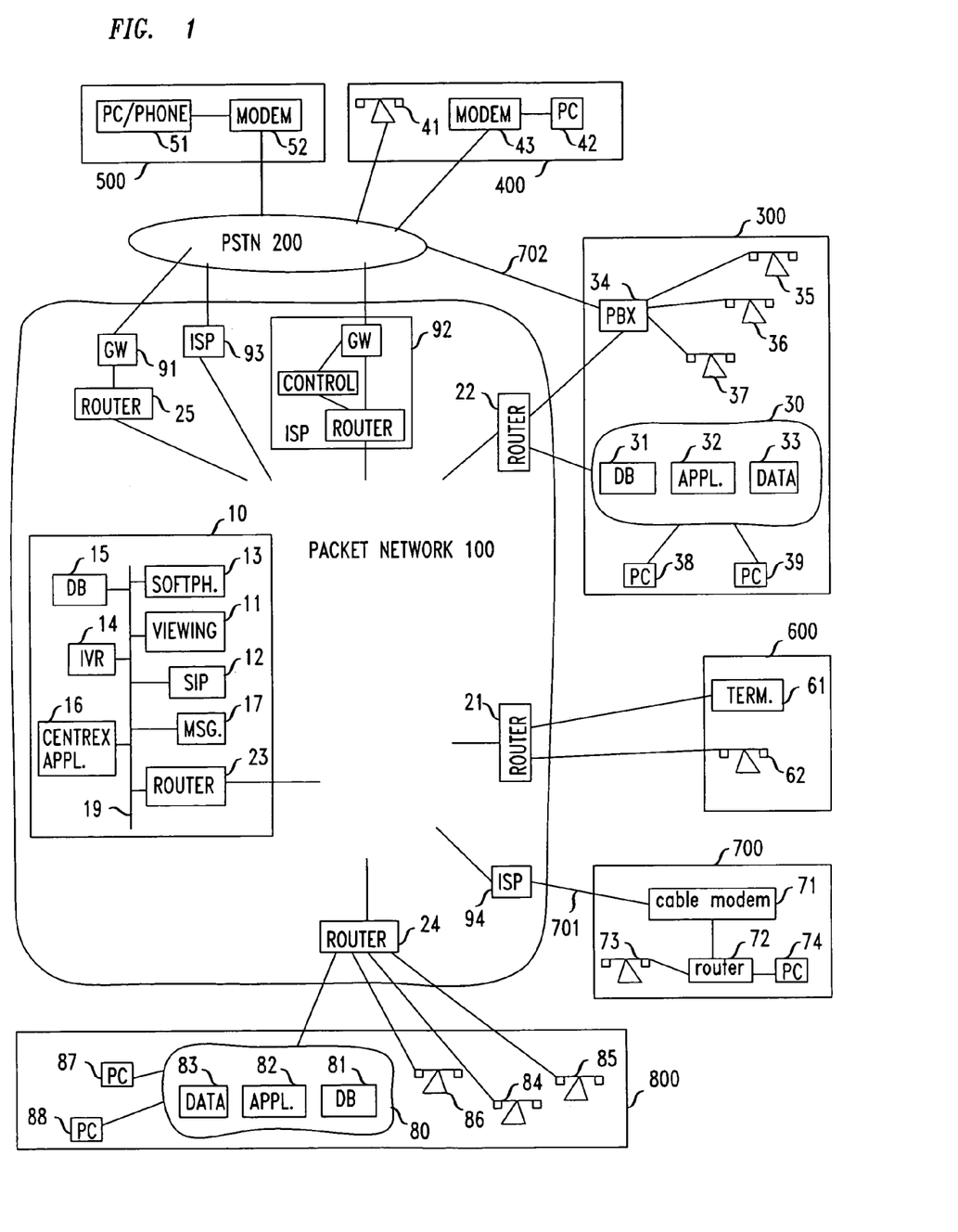
FIG. 1 presents a block diagram of an arrangement for providing a work environment that is sponsored by an enterprise to remote users who are logged in as members of the enterprise.

FIG. 1 presents a block diagram of an arrangement in accord with the principles disclosed herein. It depicts a packet switched network 100 (for example, the Internet), a public switched telephone network (PSTN) 200, enterprises 300 and 800, and individual user locations 400, 500, 600, and 700.

User location 400 comprises a plain-old-telephone-service (POTS) telephone 41 that is connected to PSTN 200 (which includes an SS7 signaling network that is not shown), and PC 42 that connects to an Internet Service Provider (ISP) within network 100, for example, ISP 92, via modem 43 and PSTN 200. The ISP comprises a gateway that serves as an interface to PSTN 200, a controller (for providing Internet access to only specified subscribers), and an edge router that connects the ISP to network 100. Voice communications by a user of telephone 41 at location 40 to other PSTN telephones are carried out in accord with conventional PSTN interactions. Voice communication by telephone 41 with a destination telephone that is reachable only by going through packet network 100 is also carried out in accord with conventional PSTN interactions, but with an intermediate point, which is a gateway to network 100, such as gateway 91. Gateway 91, in turn, is coupled to network 100 via edge router 25, and interacts with the destination telephone in accord with the IP telephony protocol employed in network 100.

User location 500 comprises PC 51 that is connected to an ISP in network 100 (for example, ISP 93) via modem 52 and PSTN 200. PC 51 includes a "softphone" program that emulates a telephone that is adapted to operate in an established IP telephony protocol. Thus, a user at location 500 can conduct voice communication with a destination telephone through computer PC 51. Of course, such voice communication passes through network 100, and must interact with a unit that is coupled to Internet 200 and which employs the same digital protocol that is used by the software of computer 32. This unit may be the destination telephone itself, for example, IP telephone 62 (described infra), or a gateway, such as gateway 91, if the destination telephone is reachable only via PSTN 200.

User location 600 comprises terminal 61 that is adapted to communicate in the IP protocol and is coupled to network 100, and IP telephone 62 (for example, Polycom SountPoint IP 400 telephone made by Toshiba) that is also coupled to network 100.

More specifically, the coupling is via a connection to edge router 21, with terminal 61 having one fixed IP address, and telephone 62 having another fixed IP address. As an aside, the telephone that is emulated in computer 51 at location 500 can be arranged to provide the same functionality as that of telephone 62.

User location 700 comprises PC 74 that is connected to network 100 via Hybrid Fiber Coax (HFC) cable 701, which is connected to ISP 94. Router 72 and cable modem 71 are interposed between PC 74 and cable 701. Router 72 is capable of coupling other devices to ISP 94 through cable 701, and FIG. 1 shows a physical IP telephone 73 that is so connected.

The different hardware configurations of users 400, 500, 600, and 700 are presented to illustrate the versatility of the FIG. 1 arrangement.

Enterprise 300 includes both telephony and data processing functions in its work environment. For its telephony functions, enterprise 300 includes PBX 34, and a plurality of telephones on the line side of the PBX, illustratively, telephones 35, 36, and 37. PBX 34 is connected to PSTN 200 via trunk cable 702, allowing a POTS telephone to communicate with, for example, telephone 36, via PSTN 200 and a trunk in cable 702. Within PBX 34, or associated therewith, there is a call control server element that is equivalent (in its functionality) to SIP server 12, and this call control server interconnects PBX 34 to network 100 via edge router 22. When the connection of PBX 34 to network 100 is adapted to carry both signaling and voice packets, the PBX may be referred to as an IPPBX.

For its computing and data needs, enterprise 300 includes intranet 30, to which a plurality of PC's are connected; illustratively, PCs 38 and 39. Intranet 30 is connected to network 100 via edge router 22. To illustrate the principles disclosed herein, intranet 30 is shown to include a database 31, an applications server 32, and a data store 33 (which may comprise an entire hierarchical network of storage devices).

Enterprise 800 is similar to enterprise 300, except that IP Centrex server 16 within complex 10 contains information relating to the telephony functions (features) of IP telephones 84, 85, and 86, which are coupled to within network 100 server via edge router 24. In fact, IP Centrex server 16 handles the telephony functions (features) for other IP telephones that are coupled to network 100 as well, such as telephone 62.

Lastly, server complex 10 within network 100 additionally includes a viewing server 11, a SIP server 12, media server 14, mailbox server 17, phone application module 13, and database 15. All are connected to local area network 19, and through router 23 that is also connected to LAN 19, all are accessible from network 100.

One objective of the arrangement illustrated in FIG. 1 is to provide the ability for an individual user to log in as a member of an enterprise, for example, enterprise 300. By logging in, the individual user obtains a telephone number that is associated with the telephone instrument that is accessible at the location where the user logs in, which telephone number is also associated with the enterprise, and concurrently obtains the ability to access, read, write, and modify files in accordance with permissions specified by the enterprise. Additionally, the association of the telephone number is made so that with respect to telephones within and outside the enterprise to which the user is effectively logged in, the telephone instrument at the logged-in user's location appears as a full-fledged member of the telephones that belong to the sponsor enterprise (in terms of telecommunication features, capabilities, and attributes). This applies to the individual user and to all other parties (whether they are calling parties, or called parties). Further, the access to files in accordance with permissions specified by the sponsor enterprise is such that a file can be stored only where specified by the sponsor enterprise, and one location that is particularly excluded is the storage devices at the logged-in user's PC.

Consequently, the user cannot disseminate files to anyone, even in embodiments where an individual user can be concurrently logged in as a member of a number of two different enterprises (e.g., enterprise 300 and enterprise 800).

Indeed, in the illustrative embodiment of FIG. 1, the access that a user has to a file is really an access to a view of the file. The file itself, and even its temporary (working) copy, is stored as specified by the sponsor. In most embodiment, in fact, it is expected that files will be stored only in the data store of the sponsor enterprise (e.g., data stored 33). The user may be permitted to modify the file, and even store the modified file, but the target location of such storing cannot be contrary to restrictions imposed by the sponsor enterprise. To illustrate, in the case of enterprise 300 being the sponsor enterprise, a user known as consultant Adam might be given access to all files and subdirectories of enterprise_300\division_A\department_B and might be permitted to store files only in directory \enterprise_

300\division_A\department_B\consultant_Adam and subdirectories below it.

In one sense, it is viewing server 11 of complex 10, in combination with other elements within complex 10, which achieves this latter capability. Viewing server 11 provides the interface between the apparatus at a user's location (side A of the interface) and the files and applications of sponsor enterprises (side B of the interface). An embodiment of viewing server 11 that achieves this capability is one where viewing server 11 operates in a protocol that assumes that the user's apparatus is a terminal. The apparatus can be a true terminal that includes hardware to allow it to operate in a packet-network environment and in a predetermined protocol, such as terminal 61, or it can be a PC (e.g., 42) with software that emulates a terminal. By way of definition, as employed herein, a terminal is a device that is effectively (operationally) devoid of an associated storage element, such as a hard drive. A PC that executes a browser application, which presents one or more windows to the user, and each window can display data, but the window does not have the ability to store a file that is being presented in the window (though it might have the ability to store the screen image of the that is being displayed) is a terminal in the sense employed herein, because operationally it is devoid of a storage element.

To view it more generally, the storage restriction goals of this disclosure are met when, whatever file structure exists on side B cannot be seen by applications that are executed on side A. Consequently, a user's PC cannot gain access to files on side B. Correspondingly, applications that relate to files on side B must be executed on side B, and a restriction to prevent storing files on side A can be easily achieved. If the file structure on side B also cannot see the file structure on side A, then such storage prevention is inherent.

Thus, the logged-in user is provided with a work environment that is specifically restricted and controlled by the enterprise to which the user is effectively logged in. This enterprise is the sponsor of the work environment that is made available to the logged-in user.

Since each individual user interacts with an IP telephone (emulated or physical) and a terminal (emulated or physical) regardless of the location in which the user is, the disclosure that follows describes the operation of the FIG. 1 arrangement only relative to user at location 600, which is representative of operations relative to other locations as well. Also, for sake of simplicity, it is assumed that the terminal interactions are browser-based.

Logging In

Figure 2:
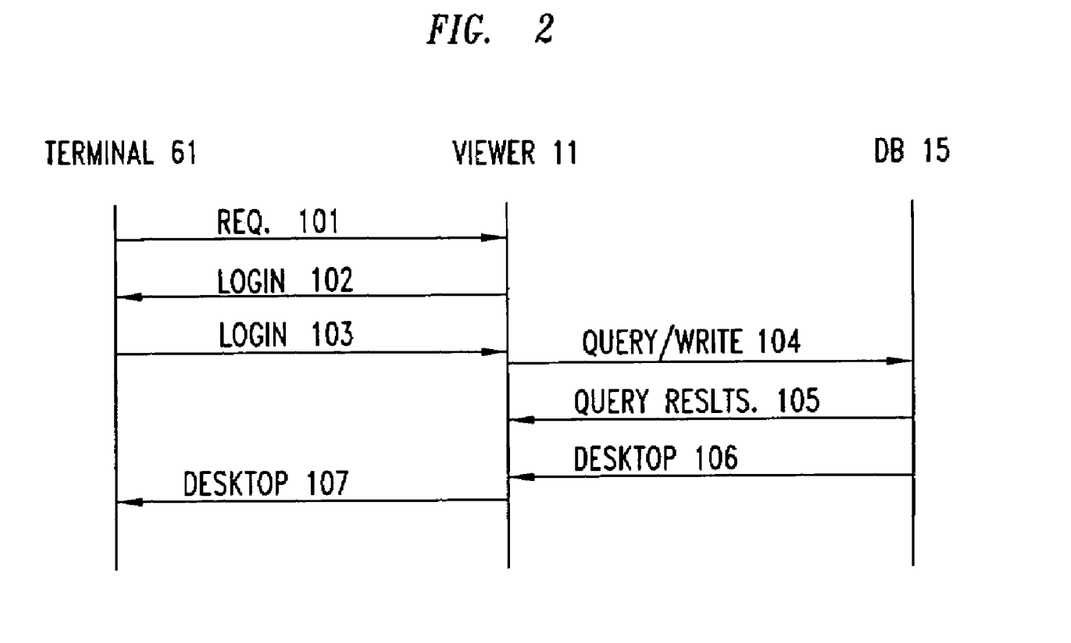
FIG. 2 shows the login process.

To log in, a user at location 600 (for example, Adam) enters the IP address of viewing server 11 into the URL field of a browser window at terminal 61 and thus sends a connection request to viewing server 11 (message 101 in FIG. 2). In response, viewing server 11 presents a login screen to terminal 61 (message 102), to which Adam responds with a user ID and password that is appropriate for membership in whatever enterprise Adam wants to work with, for example, enterprise 300 (message 103). Viewer server 11 receives the entered user ID and password, and extracts from the received packet the IP address of the open and active browser at terminal 61, which includes the IP address of terminal 61 itself. Viewer server 11 then queries a "sponsored users" table in database 15 by providing the user ID, the password, and the IP address of terminal 61. The "sponsored users" table might have the following columns:

user ID password sponsor assigned telephone number.

When the user ID and password are correct, database 15 informs server 11 that the user is bona fide, and viewing server 11 accesses a "user locations" table in database 15, to find a telephone instrument that is co-located with the device that has logged in. The "user locations" table therefore has the following columns:

address of terminal (IP)

address of telephone.

Having obtained the IP, or PSTN, address for the telephone instrument associated with the user location that has terminal 61—in this case, the IP address of telephone 62—viewing server 11 creates (perhaps with aid from applications server 16) an entry for Adam in an "active users" table of database 15.

The sequence of messages between viewing server 11 and database 15 is represented by messages 104 and 105 in FIG. 2.

The created entry associates Adam with the IP address of the open browser window of terminal 61 that was used to login, and the IP address of telephone 62. The entry also specifies that Adam is sponsored by (or is a member of) enterprise 300, and includes whatever additional information a particular embodiment requires. For example, the additional information may comprise the telephonic features that enterprise 300 wishes Adam to have, and the data processing options that enterprise 300 wishes Adam to have. In such an embodiment, the "active users" table has the following columns:

user ID sponsor address of terminal (IP)

address of telephone telephony options data processing options.

It is noted that when the user interacts with viewing server 11 by means of a PC that is running a browser application, and the interaction is via a browser window, the capability exists for the user to effectively have a plurality of terminals at the user's location, because browser applications typically are capable of supporting a plurality of windows. The "address of terminal" entry in the "active users" table then is the ID of the particular browser window through which Adam is logged in. This ID includes the IP address of the PC that is creating the browser window.

The telephone number that is associated with Adam is one that is also associated with enterprise 300, in the sense that calls made by a telephone that is associated with that number are charged to an account that is paid by enterprise 300.

Once the entry is installed in the "active users" table, viewer 11 retrieves a desktop screen from database 15 (message 106), and sends it to terminal 61 (message 107). The desktop screen informs Adam that he is logged into the work environment sponsored by enterprise 300, and provides icons that activate various applications that enterprise 300 chooses to make available to Adam.

It is noted that in connection with user location 400, the telephone instrument that is accessible to Adam is a POTS telephone 41 and, therefore, the "user locations" table in database 15 contains a POTS number, rather than an IP number. That presents no problem, however, because an IP telephony connection to POTS telephone 41 is easily established with the aid of gateway 91.

It should also be noted that Adam might wish to be logged in concurrently as a member of two sponsoring enterprises, for example, as a member of enterprise 300, and as a member of enterprise 800. Adam accomplishes this by opening another browser window and performing a login in that other window. In such a case, the "active users" table contains two entries for Adam, with one of the differences being that the two entries have two different "address of terminal" addresses, of the two different browser windows in terminal 61.

To affirmatively terminate a registration, the user activates a log-off icon on the desktop. In response to such activating, viewing server 11 remotes the appropriate entry from the "active users" table, and presents a login page to terminal 61. When the user closes the browser window but does not log-off, it is possible to arrange for the registration to be maintained, but it is not advisable. Accordingly, it is best to have viewing server 11 ping terminal 61 regularly whenever the user is idle, to make sure that the window is still open.

Telephony Functions

In describing the telephony functions, it is assumed that enterprise 300 is the work environment sponsor, and that Adam is logged in as a member of enterprise 300 at terminal 61 at location 600, having telephone 62 accessible to him, with the number assigned as instructed by enterprise 300 via database 15. SIP server 12 (together with some of the associated other elements within complex 10) is the call-processing server associated with location 300, performing the call control functions that, in the POTS environment, are handled by the local switches and the SS7 signaling network.

To make an outgoing call, Adam can work with terminal 61, or without terminal 61.

When working with terminal 61, Adam initiates the outgoing call, for example as a member of enterprise 300, by selecting the browser window on terminal 61 where Adam had logged in as a member of enterprise 300 (i.e., placing it in the foreground), and clicking on a telephone icon in the desktop that is displayed in that window. Clicking on that icon sends a message to viewing server 11 (request message 110 in FIG. 3), thus informing viewing server 11 that Adam, as characterized by the ID of the foreground browser window, wishes to place a call. This message is relayed via local area network 19 to phone application module 13 (message 111), which responds with a screen that requests Adam to identify the called party (message 112). Adam receives this screen via viewing server 11 (message 113), enters the called party's phone number, for example, that of telephone 85, and forwards that information to server 11 (message 114). This information, which includes the ID address of the foreground browser window, is relayed to SIP server 12, also over LAN 19 (message 115). In this manner, SIP server 12 obtains information about both the calling and the called parties. At this point, SIP server 12 accesses database 15 (message 116) and obtains responsive information (message 117). Based on the provided called party's telephone number, database 15 returns the IP address of the called number (that is, when the called number corresponds to a telephone that is accessible via network 100). Based on the provided ID of the foreground browser, database 15 returns the IP address of the telephone at the location of terminal 61, which in this example is the IP address of telephone 62. Additionally, database 15 returns the fact that Adam is calling in his capacity as a member of enterprise 300, returns the telephone number that had been assigned to Adam when he logged in as a member of enterprise 300, identifies the options that are to be made available to Adam at telephone 62, and returns caller-ID information (e.g., whether caller-ID information is permitted to be forwarded).

Figure 3:
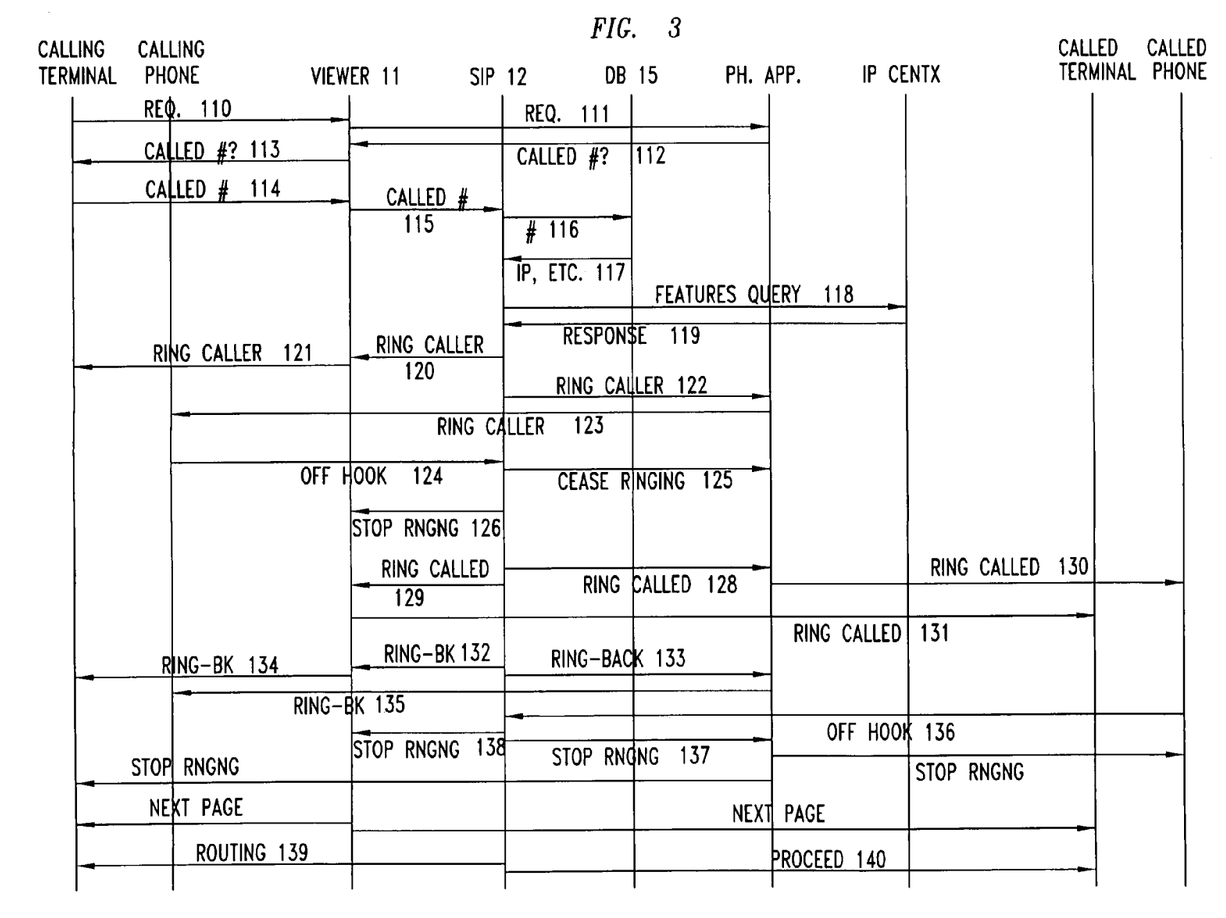
FIG. 3 shows the process for dialing out by a logged-in remote user.

Armed with information about the IP address of the called telephone 85, and the IP address of caller telephone 62, a connection can be established, but before establishing the connection, SIP server 12 accesses IP Centrex application server 16 to obtain information about telephony features of the calling and called parties; for example, what to do when the called party does not answer (message 118). Once that information is obtained, SIP server 12 sends a ringing message to the calling party. More specifically, SIP server 12 sends a ringing message to viewing server 11 (message 120), and viewing server 11 sends a ringing page to terminal 61 (message 121). Essentially concurrently, SIP server 12 sends a ringing message to phone application module 13 (message 122), and the latter sends a stream of packets to telephone 62 that, when received and converted to audio, creates a ringing sound (message 123). The ringing page that viewer 11 sends illustratively includes an applet that creates a ringer image that changes with time and a ringing sound (if terminal 61 has the processing capability to response to the applet, and audio capability).

It is noted that other embodiments may send a ringing signal only to the terminal, or only to the telephone.

When Adam goes "off-hook" at telephone 62, the "off-hook" message that is sent to SIP server 12 (message 124) causes SIP server 12 to send a "stop ringing" message to module 13 (message 123) and to viewing server 11 (message 126). SIP server 12 then determines whether caller ID information is to be sent to the called party, and in what form. If this requires computing capabilities that SIP server 12 does not have, SIP server 12 utilizes applications server 14, which is accessible to SIP server 12 via LAN 19.

As for the form of the caller-ID message that is provided to the called party, when the called party is not a member of enterprises 300—such as telephone 41—the caller ID, if provided, provides the full telephone number that is currently associated with telephone 62, and perhaps the name—in this case, Adam's name. On the other hand, when the called party is a member of enterprises 300—such as telephone 35—only the extension number, rather than the full number, is provided.

Thereafter, SIP server 12 sends a message to phone application module 13, directing it to ring the called party's telephone (message 128), and to viewing server 11, directing it to ring the called party's terminal (message 129). Responsively, phone application module 13 sends a ringing signal to the called telephone (message 130), and viewing server 11 sends a ringing page to the called terminal (which is not explicitly shown in FIG. 1). The page to the called telephone's terminal includes the caller ID, if appropriate (message 131). Effectively concurrently with the ringing message that is sent to the called party, SIP server 12 sends a ring-back message to viewing server 11 (message 132) and to phone application module 13 (message 133). Responsively, viewing server 11 sends a ring-back screen to terminal 61 (message 134), and phone application module 13 sends a ring-back signal to telephone 62 (message 135).

When the called party's terminal goes "off hook," and a corresponding message arrives at SIP server 12 (message 136), a message is sent to phone application module 13 (message 137) and to viewing server 11 (message 138) to cease the ringing and ring-back alerts at the called party, and the calling parties. Phone application module 13 executes the command to cease ringing to the called telephone 85, and to cease the ring-back at calling telephone 62. Message 138 is extended to terminal 61, and the terminal associated with telephone 85 through a new web page that indicates that a call is in progress, and provides various call control options that are made available to Adam (and to the user of telephone 85). At this point, SIP server 12 sends a message to telephone 62 to send packets to the IP address of telephone 85 (message 139), and a message to telephone 85 to send packets to the IP address of telephone 62 (message 140).

The above discloses the method for establishing a call that is initiated by Adam from location 600 by employing terminal 61. Alternatively, as indicated above, Adam can initiate a call using telephone 62.

When a call is initiated solely through telephone 62 (and terminal 61 is not available), a threshold issue is: in what capacity is the call being made. Obviously, Adam may be making a call in his individual capacity, or as a member of enterprise 300. If Adam is also logged in as a member of enterprise 800, then the outgoing call might be as a member of that other enterprise. Hence, when Adam goes off hook at telephone 62, and that causes a packet to be sent to SIP server 12, the nature of the outgoing call needs to be identified. Accordingly, when SIP server 12 receives an "off-hook" packet from telephone 62 that indicates an outgoing call, server 12 sends a message to database 15 to determine whether Adam is logged in as a member of one or more organizations. If so, SIP server 12 engages interactive voice response (IVR) media server 14, provides it with information about the associations of Adam that were found in database 15, and directs server 14 to engage in an interactive session with to telephone 62 to obtain information about the capacity in which Adam is placing the outgoing call. This interactive session is conducted in a conventional manner between IVR 14 and Adam at telephone 62, at the end of which, IVR media server 14 informs SIP server 12 that, for example, Adam is placing a call as a member of enterprise 300. At such a time, SIP server 12 proceeds effectively as disclosed above. That is, SIP server 12 contacts phone application module 13 and module 13 sends a steam of packets to telephone 62 that, when converted to sound at telephone 62, provides a dial tone. Adam dials the telephone number of the called party (telephone 85) and a corresponding stream of packets is sent to SIP server 12. As before, SIP server 12 discovers the IP address of telephone 85, rings telephone 85 as disclosed above, provides ring-back signal to telephone 62 as disclosed above, and establishes a connection between the calling party telephone and the called party telephone when the called party telephone goes "off-hook."

The above discloses the method for establishing a call that is initiated by Adam from location 600 to telephone 85. It is noted that telephone 85 is accessible directly from network 100, but there are other telephones that Adam might wish to call that are accessible only by also traversing PSTN 200, for example, telephone 41. In such a case, as indicated above, a gateway is involved. To establish a connection to telephone 41, the process disclosed above with reference to FIG. 3 takes place, except that in data returned in message 117 by database 15 is IP address of a gateway, for example, gateway 91 (in contrast to the IP address of telephone 85, in the above example). Instead of sending a ringing message to gateway 91, SIP 12 sends call-establishment request message to gateway 91, specifying the telephone number of telephone 41. Gateway 91 engages the SS7 signaling and control network of PSTN 200 (not shown), and the latter causes a ringing signal to be sent to telephone 41. When telephone 41 goes off-hook and that state is detected in gateway 41, it sends an off-hook message to SIP server 12, and the process continues, as disclosed above. In essence, a communication path is established between IP telephone 62 and POTS telephone 41, with gateway 91 interposed at the junction between network 100 and PSTN 200, making the necessary signal conversions.

When Adam wishes to place a call to a telephone within the sponsor enterprise, for example, telephone 35, the process that may be established a priori is that such calls are treated as calls to a POTS telephone, going via PSTN 200 and a trunk in trunks cable 702. In such an event, the process is as disclosed above for telephone 41. Alternatively, the process that may be established a priori is that such calls are treated as IP telephony calls. In such a case, both call establishment packets as well as the voice packets flow through router 22. The call establishment packets interact with the call control unit within (or associated with) PBX 34, mentioned above, and that call control unit interacts with the telephone 35.

Of course, if an abbreviated dialing capability is available to telephones 35-37, for example, to reach a telephone within enterprise 300 by merely dialing an extension of a telephone, in accord with the aim of having Adam have the same environment at telephone 62 that telephones 35-37 have, it is necessary to allow Adam to also use the same type of abbreviated dialing.

This presents no problem for SIP server 12 because when SIP server 12 knows that Adam is the source of the dialing (as a member of enterprise 300), the fact that only the extension number (e.g., 4 digits) was provided to SIP server 12 is indicative of the fact that the destination telephone is one that belongs to enterprise 300. A slight ambiguity exists in that the destination telephone whose extension Adam dialed may correspond to a telephone on the line side of PBX 34, or may correspond to a telephone at a remote location. SIP server 12 can disambiguate this situation by consulting database 15. If it finds no entry in the "active users" table of database 15 that corresponds to the dialed extension, SIP 12 can conclude that the called party is a telephone on the line side of PBX 34. A connection is then established in the manner described above.

Figure 4:
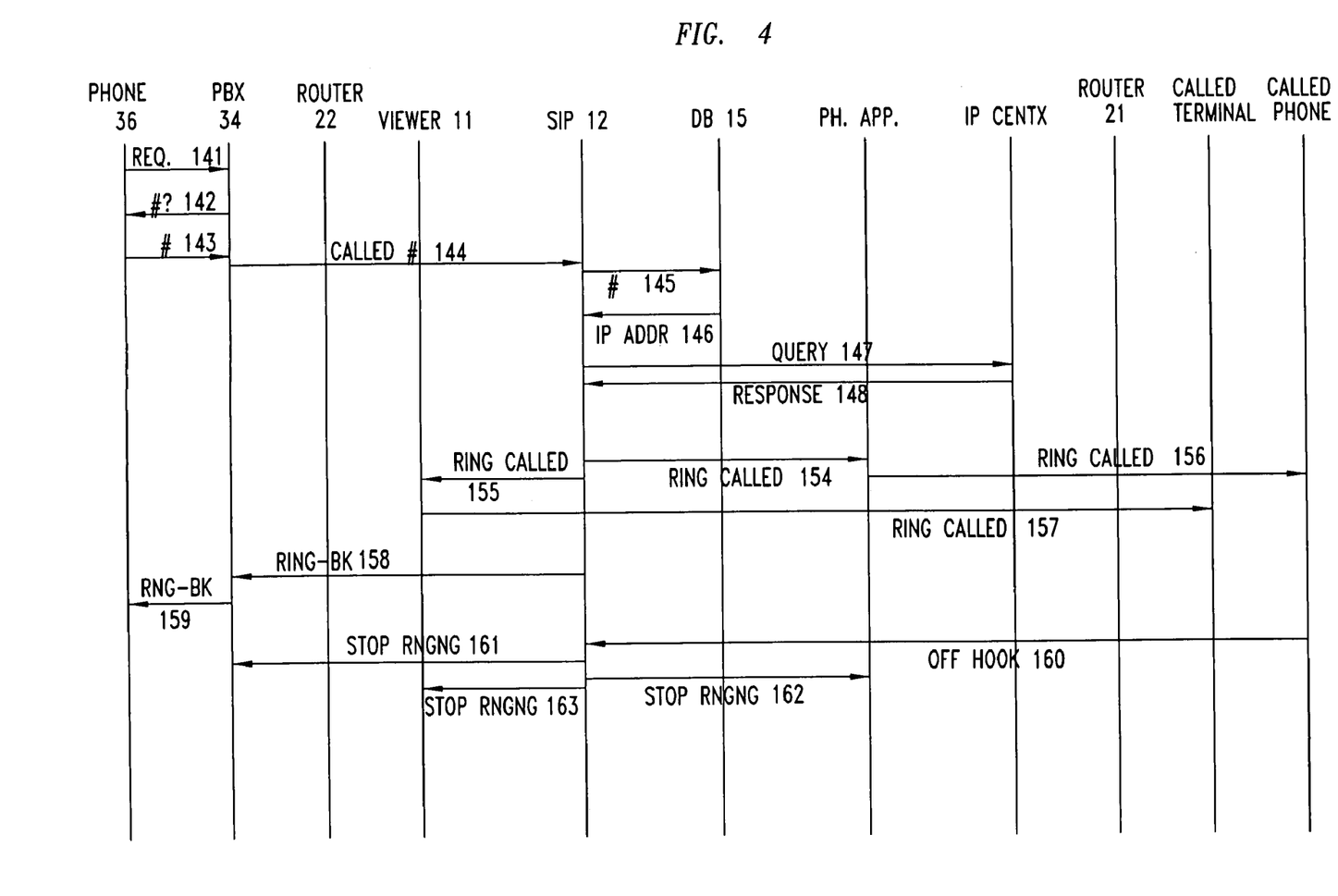
FIG. 4 shows the process for dialing to by a logged-in remote user.

To receive an incoming call from a telephone within enterprise 300, for example, from telephone 36, the process is as follows.

Telephone 36 goes "off-hook" (message 141 in FIG. 4) receives a dial tone from PBX 34 (message 142), and dials Adam's assigned number (message 143), perhaps by employing the abbreviated dialing of PBX 34, for example, the extension only. A database within PBX 34 informs the call control unit of PBX 34 that the dialed extension belongs to a group of individual users who are located externally of enterprise 300 (indeed, the enterprise knows that the dialed extension is assigned to Adam, whenever he logged in). Consequently, the call control unit sends a message to SIP server 12, through edge router 22, router 23, and network 100 therebetween (message 144). The message is a request to establish a call with the specified extension, and includes the caller ID information, if the call control unit of PBX 34 chooses to include the caller ID information.

Having received a destination number from PBX 34 (albeit a truncated one), SIP server 12 interprets that number as an extension number of an individual user who is logged in as a member of an enterprise having an IP address corresponding to the source address of the incoming message 144. SIP server 12 applies this information to database 15 (message 145) and receives, in response, the IP address of telephone 62 and terminal 61.

As before, SIP server 12 accesses IP Centrex 16 (message 147) for relevant features (e.g., how to handle a "called party doesn't answer" situation), the features are provided to SIP server 12 (message 148), and SIP server 2 proceeds with sending a ring message to phone application module 13 (message 154) and to viewing server 11 (message 155), including the caller ID information, if appropriate. Module 13 sends a ringing signal to telephone 62 (message 156), and viewing server 11 sends a ring screen to terminal 61 (message 157), which screen is adapted to automatically become active and appear in the foreground (making it easier for Adam to recognize that new information is being displayed on terminal 61). SIP server 12 also sends a ring-back message to PBX 34 (message 158), which is extended by the call control unit of PBX 34 to telephone 36 (message 159). Finally, when Adam goes "off hook" on telephone 62, an "off hook" message is sent to SIP server 12 (message 160) and, in response, SIP server 12 directs PBX 34 to discontinue the ring-back signal (message 161), directs viewing server 11 to remove the ringing screen from terminal 61, and directs module 13 to cease ringing at telephone 62.

It should be appreciated that, as indicated above, the functionality of the SIP server 12 in combination with some of the elements in complex 10 is the same as that of the SS7 signaling network in conventional telephone networks, and therefore it should be within the ken of all skilled artisans to implement various other telephony functions in the FIG. 1 arrangement, based on the above description and knowledge of how such features are implemented in conventional telephone networks.

On interesting feature relates call control features other than initiating calls. As indicated above, when a call is established with the aid of a terminal, call-control features, for example, call transfer options, are presented at the terminal and can be activated from the terminal. When a call is established without the terminal, or if the destination telephone does not have an associated terminal, and it is desired to activate a call control feature, such as call transfer, the set of call-control options is reached by sending a prearranged message to SIP 12 (for example, by dialing a predetermined number, or digit, or symbol on the telephone's keypad) that engages IVR 14 to interact with the telephone that seeks to access the features. An interactive session between the user and IVR 14 yields the necessary information, that information is communicated to SIP server 12, and the feature is executed.

Another interesting feature relates to messaging. When, for example, the user at telephone 85 calls Adam as a member of enterprise 300, who is logged in at location 600, but Adam fails to go "off hook" and send message 136 within a predetermined time after SIP server 12 sent message 128—the classic "called party doesn't answer" condition—then, if the messaging option is made available to Adam, SIP server 12 sends out messages 137 and 138 directing viewing server 11 and module 13 to stop ringing at location 600 and to stop the ring-back signal at telephone 85. SIP server 12 also sends a message to the calling telephone 85 to provide it with the IP address of messaging server 17 and a message to server 17 to provide it with the IP address of telephone 85 and the instruction that a message is to be stored for Adam as a member of enterprise 300. Messaging server 17 engages its own IVR (or IVR 14), which interacts with the user at telephone 85. In this manner, a message is obtained from telephone 85, and is saved in messaging server 17 for Adam, as a member of enterprise 300.

The voiced message arrives in digital form and is stored, for example, as a file, in a hierarchical file structure, where all voice mail that is stored for individuals who are sponsored by enterprise 300 is stored in a subdirectory that is dedicated to that individual. In such an embodiment, the subdirectory is effectively the individual's messaging mailbox. It can be appreciated that Adam can have multiple messaging mailboxes, each dedicated to Adam as a member of different enterprises.

To retrieve a message, Adam activates a voicemail application at his desktop. This application might reside in messaging server 17, in applications server 14, or in the applications server of the sponsor enterprise, for example, application server 32. In embodiments where the voicemail application resides in messaging server 17, when Adam activates the voicemail application, viewing server 11 executes the voicemail application in messaging server 17 with a command line that includes the salient characteristic of Adam's window, which is, that it is a window that belongs to Adam as a member of enterprise 300. Armed with this information, mail server 17 interacts with the storage of server 17, accesses the appropriate subdirectory, ascertains the number of voicemail messages that are found in the subdirectory, engages the VRU, and outputs the voicemail messages pursuant to whatever schema is designed for the retrieval of messages.

When a connection cannot be made because Adam's telephone is busy, or when Adam is not logged in, essentially the same process takes place to store voice mail messages in Adam's mailbox.

Computing

As indicated above, when Adam logs into the FIG. 1 arrangement as a member of a particular sponsor, he is presented with a desktop screen with various icons that correspond to applications that Adam may execute. Some of the above description dealt with one such application—i.e., the telephony application. Other applications are, of course, also provided.

One salient feature of the FIG. 1 arrangement is that the apparatus that Adam is using in his interactions with the FIG. 1 arrangement is a terminal, or more importantly, that the FIG. 1 arrangement believes that it is a device without a capacity to store files and without an ability to execute applications that operate on files of the sponsor enterprise and, therefore, provides no means for storing information at the terminal, or for handling any of the files that are made accessible by any application other than an application that is made available by the arrangement. As disclosed above, Adam's terminal interacts with viewing server 11, which effectively enforces the "no storage at the terminal and no enterprise file processing at the terminal" paradigm by presenting only one-screen views to the terminal. Even viewing server 11 does not have a local storage means that is accessible to Adam.

Another salient feature of the FIG. 1 arrangement is that the applications that are provided on Adam's desktop are provided by the enterprise to which Adam has logged in.

Moreover, those applications are conditioned (with options that are set) in accordance with the wishes of the enterprises to which Adam has logged in, and are executed in processing elements that the enterprise specifies. Thus, when Adam logs in as a member of enterprise 300, he receives an "enterprise 300 desktop," and when Adam logs in as a member of enterprise 800, he receives an "enterprise 800 desktop" that may be significantly different from the "enterprise 300 desktop."

The various applications that a desktop might provide may reside and be executed in applications server 14, or in the applications servers of the various sponsor enterprises. It is also possible to have some applications in server 14 and other applications in the application servers of the various sponsor enterprises. Independently of where the applications reside, the files that are reachable by those applications can be limited to the data storage facilities of the enterprises themselves (e.g., data storage facility 33, or data storage facility 83).

One application that viewing server 11 executes is a File Structure (FS) application, which determines the file structure that is accessible to a user (e.g., Adam). This file structure is a subset of the full file structure that is potentially accessible to viewing server 11 when interacting with Adam. Another application that, most likely, is made available to Adam at his desktop is a DIR application that, by reference to the FS application, displays the file structure that is accessible to Adam. The DIR application is akin to "dir" application in UNIX machines, or to the "Windows Explorer" application in PCs that operate under the Microsoft Windows operating system. The DIR application derives its information from the FS application. The FS application constructs the file structure, by querying an "options" table in database 15 for Adam as a member of enterprise 300. This table is maintained by the entity responsible for complex 10, but is populated by the administrators of the various enterprises that partake in the capabilities offered in the FIG. 1 arrangement. More particularly, an administrator of enterprise 300 populates that portion of the "options" table that relates to users that enterprise 300 is willing to sponsor.

Many of the other applications that enterprise 300 is likely to place on Adam's desktop involve reading, altering, and writing files. Word processing and spreadsheet applications are examples of such applications. The FS application specifies the directories and files that are accessible to Adam for read-only purposes, as well as the directories and files that are accessible to Adam for read-write purposes. In this manner, the FIG. 1 arrangement achieves its goal of easily controlling the access, and the nature of the access, that a logged in individual user has to files and to applications.

One application that is quite common in today's work environment is the email application, so it is useful to briefly address it. In the FIG. 1 arrangement, the email application parallels quite closely the voicemail application, in the sense that the application, and well as the email message boxes can reside in messaging server 17. Of course, that is not a necessity, since email can be directed to the email servers of the individual sponsor enterprises.

As indicated above, it is quite simple for Adam to be logged in concurrently as a member of enterprise 300 and as a member of enterprise 800. While being so logged in, Adam can be working on his PC, for example editing a local file, with neither of the browser windows being in the foreground. Whenever Adam wishes, he can select one of the browser windows and start working (including making outgoing calls) as a member of the enterprise associated with the selected window. The only small issue arises when neither window is in the foreground and Adam receives a call. When the call is to Adam qua member of enterprise 300, his telephone rings and one of the browser windows receives a new page, i.e., a ringing page. When the call is to Adam qua member of enterprise 800, his telephone also rings and the other of the browser windows receives a new page, i.e., a ringing page. If the ringing sounds of the telephone are identical and if the modified browser windows remain in the background, and their icon representations on Adam's screen also do not change, then Adam cannot immediately identify the nature of the call. Aside from the fact that Adam can bring one of the windows to the foreground and as a result determine hat which browser window has the incoming call, other solutions are easily implemented, such as the telephone having a different type of ringing. A more satisfying solution, perhaps, is to have the browser window with the new ringing page be forced to the foreground when. Also, the audible sound of the ringing page can be made unique. In short, the principles disclosed herein allow Adam to be effectively concurrently logged in as a member of a number of enterprises, yet have the connection remain distinct, in the sense that no files of one enterprise can seep into, or be transferred to, the other enterprise, and have the telephonic communications also remain distinct.

The above presents the principles of this invention by means of an illustrative example. It should be appreciated that persons skilled in the art can create other embodiments without departing from the spirit and scope of this invention. For example, the above description considers a logged-in terminal and a co-located telephone that is connected to network 100 either directly or through PSTN 200. Of course, the principles of this invention work equally well with a cellular telephone.

Lastly, it is noted that extending the principles disclosed herein to arrangements where a remote location contains a number of telephones, a fax machine, a PBX, etc. is straightforward.

The invention claimed is:

1. A hardware arrangement that provides a work environment that appears to be within the arrangement to user data device that is remote to the arrangement and communicates with the arrangement through a network, characterized by:
   a viewing server that interacts with the remote user data device in accordance with rules that allow access only to preselected ones of files stored in the arrangement, and allows storage of accessed files only in locations within the arrangement that are preselected by the arrangement.

2. The arrangement of claim 1 where the access to the files is permitted by the arrangement only by applications that are provided by the arrangement.

3. The arrangement of claim 1 where storage of accessed files in other than the preselected locations, whether within or outside the arrangement, is prevented.

4. The arrangement of claim 1 further comprising a login module for interacting with the user data device to allow said the user data device to execute a process to log in into the arrangement.

5. The arrangement of claim 4 where the viewing server interacts with the remote user data device only after a successful login into the arrangement.

6. The arrangement of claim 1 further comprising a telecommunication server that is adapted to interact with a communication module in said user data device to allow communication between party A using the user data device and party B, via the data device, the network, and the arrangement.

7. The arrangement of claim 6 where the telecommunication server attaches attributes to the communication between party A and party B that present party A to party B as if party A is not remote to the arrangement.

8. The arrangement of claim 1 further comprising a telecommunication server that is adapted to interact with a communication module in said user data device to allow party A to employ communication service of the arrangement.

9. The arrangement of claim 1 further comprising a telecommunication server that is adapted to interact with a communication module in said user data device to allow party A to employ communication service of the arrangement in a manner that to party A and to parties that telecommunicate with party A it appears that the user data device is not remote from the arrangement.

* * * * *